US011143498B2

(12) United States Patent
Visser et al.

(10) Patent No.: US 11,143,498 B2
(45) Date of Patent: Oct. 12, 2021

(54) INTERFEROMETER SYSTEM AND USE THEREOF

(71) Applicant: Nederlandse Organisatie voor toegepast-natuurwetenschappelijk onderzoek TNO, s-Gravenhage (NL)

(72) Inventors: Huibert Visser, Rotterdam (NL); Hedser Van Brug, The Hague (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/472,538

(22) PCT Filed: Dec. 21, 2017

(86) PCT No.: PCT/NL2017/050866
§ 371 (c)(1),
(2) Date: Jun. 21, 2019

(87) PCT Pub. No.: WO2018/117835
PCT Pub. Date: Jun. 28, 2018

(65) Prior Publication Data
US 2019/0323821 A1    Oct. 24, 2019

(30) Foreign Application Priority Data

Dec. 22, 2016 (EP) .................................... 16206336

(51) Int. Cl.
*G01B 9/02* (2006.01)
*G01N 21/45* (2006.01)

(52) U.S. Cl.
CPC ..... *G01B 9/02024* (2013.01); *G01B 9/02072* (2013.04); *G01N 21/45* (2013.01)

(58) Field of Classification Search
CPC ................ G01N 21/45; G01B 9/02015; G01B 9/02024; G01B 9/02049
See application file for complete search history.

(56) References Cited

U.S. PATENT DOCUMENTS

| 3,482,919 | A | | 12/1969 | Barringer | |
|---|---|---|---|---|---|
| 4,655,587 | A | | 4/1987 | Wijntjes et al. | |
| 6,144,456 | A | * | 11/2000 | Chavanne | A61B 3/1005 356/479 |
| 6,545,761 | B1 | * | 4/2003 | Aziz | G01B 9/04 356/497 |
| 8,717,573 | B1 | | 5/2014 | Mudge et al. | |
| 2002/0048025 | A1 | * | 4/2002 | Takaoka | G01N 21/4795 356/497 |

(Continued)

OTHER PUBLICATIONS

Mar. 13, 2018—International Search Report and Written Opinion—Appl. No. PCT/NL2017/050866.

*Primary Examiner* — Jonathan M Hansen
(74) *Attorney, Agent, or Firm* — Banner & Witcoff, Ltd.

(57) ABSTRACT

Interferometer system, including optical means (2, 3, 4, 5) arranged for directing light along a first interferometer path and (separate) second interferometer path, and for combining the light for allowing interferometry, characterized in that the first interferometer path (PI) is provided with a first light transmitting structure (10) having a rotational position that is adjustable with respect to an optical axis of the first path.

35 Claims, 2 Drawing Sheets

(56) References Cited

U.S. PATENT DOCUMENTS

Figure 1:
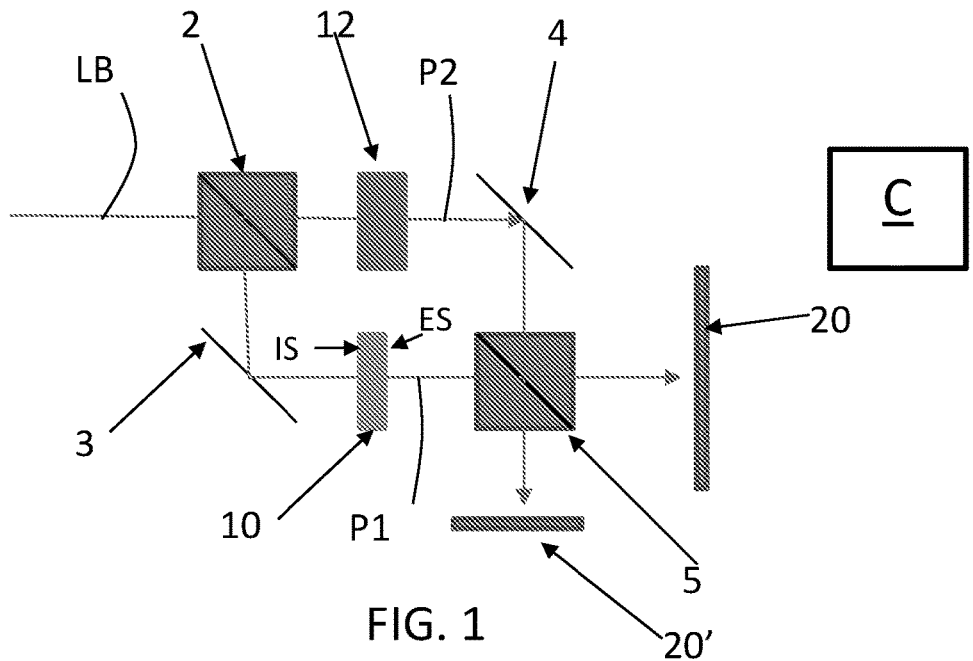

| | | | |
|---|---|---|---|
| 2004/0136006 A1* | 7/2004 | Abbink | G01B 9/02061 356/451 |
| 2008/0043247 A1* | 2/2008 | Arnold | G01B 11/2441 356/512 |
| 2008/0006861 A1 | 3/2008 | Manning | |
| 2008/0068612 A1* | 3/2008 | Manning | G01J 3/4537 356/452 |
| 2009/0147266 A1* | 6/2009 | Lai | A61B 3/1005 356/497 |
| 2009/0153873 A1* | 6/2009 | Chan | G01B 9/02014 356/495 |

* cited by examiner

INTERFEROMETER SYSTEM AND USE THEREOF

CROSS-REFERENCE TO RELATED APPLICATIONS

This application is a U.S. National Stage application under 35 U.S.C. § 371 of International Application PCT/NL2017/050866 (published as WO 2018/117835 A1), filed Dec. 21, 2017, which claims the benefit of priority to Application EP 16206336.6, filed Dec. 22, 2016. Each of these prior applications is hereby incorporated by reference in its entirety.

The invention relates to an interferometer system, as well as a use thereof.

Interferometer systems are generally known. The systems are e.g. configured to use interference of electromagnetic waves, particularly optical beams for measuring or monitoring various parameters. Particularly, the systems can detect optical path length differences, or variation in optical path length differences, between interfering beams, the path length (differences) being associated with one or more parameters to be detected. Interferometry is widely used, having applications ranging from high precision manufacturing and semiconductor industry (lithography) to planetary monitoring and astronomy.

A commonly known interferometer is the Michelson interferometer, which basically includes optical means for an splitting incoming beam into two secondary beams to following respective interferometer paths, wherein the secondary beams are reflected towards a imaging device/detector, the detector being configured to detect a resulting interference pattern. Detector signals can be processes by a suitable signal processor (e.g. computer system) for generating an interferometer result, e.g. including an optical path difference (OPD).

Another commonly known interferometer system is the Mach-Zehnder type interferometer, which includes an improved optical system for splitting and combining optical beams in order to generate interference patterns/signals.

It is known to adjust the OPD by placing a path length increasing structure in one or both of the interferometer paths. For example, it is known to place a test cell for including an optically transparent test fluid in one of the interferometer paths and to place a compensating cell for including an optically transparent reference fluid in the other interferometer path. Also, other means are known for setting path lengths and respective OPDs.

A general problem of interferometer systems is the setting-up and calibrating of the system, and subsequent maintaining the system in a predetermined steady state for allowing reliable interference pattern measurements. To that aim, the known interferometer system is installed under highly stable conditions, using solid, rigid support structures and proper thermal conditioning of the system.

The present invention aims to provide an improved interferometer system. In particular, the invention aims to provide a system wherein setting-up, calibrating and/or maintaining a system OPD configuration can be achieved simply yet effectively.

To that aim, an aspect of the invention provides a system that is characterized by the features of claim 1.

According to an aspect the interferometer system includes optical means arranged for directing light along a first interferometer path and (particularly separate) second interferometer path, and for combining the light for allowing interferometry. The first interferometer path is provided with a first light transmitting structure having a rotational position that is adjustable with respect to an optical axis of the first path.

In this way, adjusting an OPD can be achieved in an efficient and straight-forward manner. In particular, an OPD of the system can be set or adjusted by simply setting or adjusting a rotational position of the first light transmitting structure, wherein the rotational position of that structure is associated with the OPD. For example, the first light transmitting structure can be configured to locally provide a first optical path when it is in a first rotational position, and to locally provide a second (different from the first) optical path when it is in a second (different from the first) rotational position.

The resulting system provides significant advantages, particularly leading to improved interferometer setup during construction, during system initiation (e.g. including calibration after construction), as well as improved detector results such as better stability and increase of interferometer resolution. This holds both for systems that are located 'on the ground', i.e. at or below the earth's surface level as well as moving or in-flight systems such as interferometer systems located aboard transport systems, vehicles, naval or off-shore systems, aircraft or spacecraft or the-like.

According to a further embodiment, the first light transmitting structure is removable from the first path.

Thus, the system can be set-up or used in a condition without the presence of the first light transmitting structure in the first path. This allows for improved, efficient calibration of the system. Preferably, the first light transmitting structure is reversibly removable from the first path. The system can be configured to allow manual removal of the first light transmitting structure from the first path, and preferably manual replacement of that structure in the first path.

Alternatively, the system may include a removal or displacement means for automatically removing and/or replacing the first light transmitting structure from and/or back into the first interferometer path. The skilled person will appreciate that such removal or displacement means may include one or more actuators, motors, servos and/or other drive means, directly or indirectly connected to light transmitting structure (or carrier thereof) to move that structure. In this way, setting-up or system calibration can be carried out under conditions wherein the system is in a difficult-to-reach location, for example a location remote from an operator, in space or as part of an extra-terrestrial unit, in a operational semiconductor machine, and the-like.

Preferably, the setting or adjusting of a rotational position of the first light transmitting structure can be achieved by a drive means, for example an electrically powered drive means. The system may include a controller, for example an analogue or digital controller, computer, processor, signal processor, hardware and/or software, for controlling such drive means. The controller can be located at or near optical components of the system, and/or it can be a remoted controller, for example remotely controlling the system via a communication network, computer network, Internet, radio communication means, or the like.

The drive means can be controlled (e.g. by the controller) for setting or adjusting the rotational position of the first light transmitting structure according to one or more predetermined parameters, calibration data et cetera as will be appreciated by the skilled person, for example in order to achieve a predetermined OPD of the system.

The first light transmitting structure can have various configurations and shapes, and can be made of various materials. For example, the first light transmitting structure can be entirely made of glass, particularly optical glass or crown glass. The first light transmitting structure may be made of one or more plates and/or layers of e.g. glass.

In a preferred embodiment, the first light transmitting structure includes a light incident surface, as well as a light exit surface that extends substantially in parallel with the light incident surface. Having parallel light entry and light exit surfaces allows for ease of beam positioning and path reconstruction.

Good results can be achieved in case a position of the first light transmitting structure can be adjusted over an angle of at least zero degrees between at least a first rotational and second rotational position with respect to the optical axis of the first path, wherein the first light transmitting structure is preferably dimensioned such that it receives all light that traverses the respective first interferometer path, during operation, in both rotational positions.

For example, the first light transmitting structure may have at least one rotational position with respect to the optical axis of the first path, in which the optical axis extends substantially normally onto an incident surface and/or exit surface of that structure.

In a preferred embodiment, the second interferometer path can be provided with a second light transmitting structure, for example having a rotational position that is not adjustable with respect to an optical axis of the first path.

The second light transmitting structure can be configured to locally affect the optical path length (e.g. locally increasing the path length compared to a situation without the presence of that structure). In a non-limiting embodiment, the second light transmitting structure may be a sample holder, configured for holding a sample (e.g. fluid, gaseous or liquid sample) in the second interferometer path. The second light transmitting structure may also be a structure that is not configured for holding a sample in the respective path, e.g. an optical element, a solid light transmitting structure or the-like.

According to an embodiment, the second interferometer path may be provided with a second light transmitting structure for locally providing a second optical path difference, the second optical path difference being larger or smaller than a first optical path difference that is provided by the first light transmitting structure in the respective first interferometer path.

The interferometer system as such may e.g. have a Mach-Zehnder or a Michelson interferometer layout.

In order to allow for example automatic calibration, the system may be provided with interferometer calibration means for setting a rotational position of the first light transmitting structure based on a test signal, for example light having a predetermined light spectrum or spectrum component. The test signal may be or include e.g. white light.

The system can be used in various ways. According to one aspect a use of the system includes:

directing light beams along the first interferometer path and second interferometer path, and combining the beams allowing interferometry, e.g. utilizing an interference pattern detecting means, wherein the rotational position of the first light transmitting structure is set to a predetermined position for locally providing a respective optical path difference.

For example, a first calibration step can be applied wherein light beams are directed along the first interferometer path and second interferometer path, without the presence of the first light transmitting structure in the first path.

Also, second calibration step can be implemented wherein light beams are directed along the first interferometer path and second interferometer path, with the presence of the first light transmitting structure in the first path and optionally with the presence of a second light transmitting structure in the second path, wherein light is used having a predetermined light spectrum or spectrum component, for example light that is passed through a test fluid before entering the interferometer paths, wherein a rotational position of the first light transmitting structure is set based on analysis of a detected interference pattern concerning the combined beams, particularly for optimizing the interference pattern.

In this way, system accurate and efficient calibration can be achieved. This is for example highly advantageous in case the system is located in a remote or hard to reach location, such as in a space craft or satellite, located in space, in a vacuum, in a operational semiconductor machine or the-like.

Figure 2:
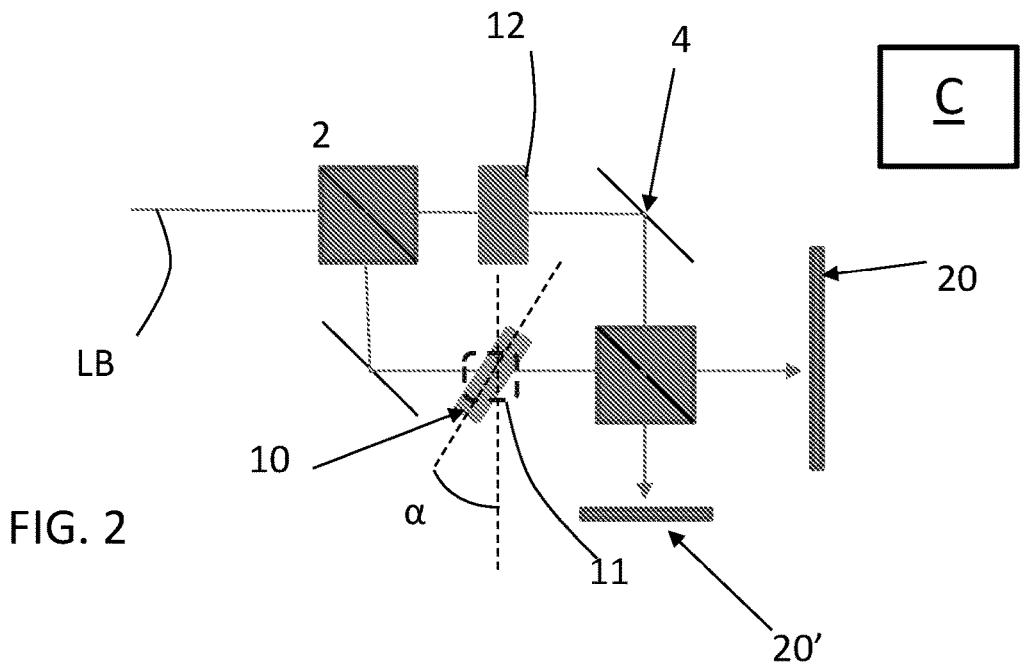
Figure 3:
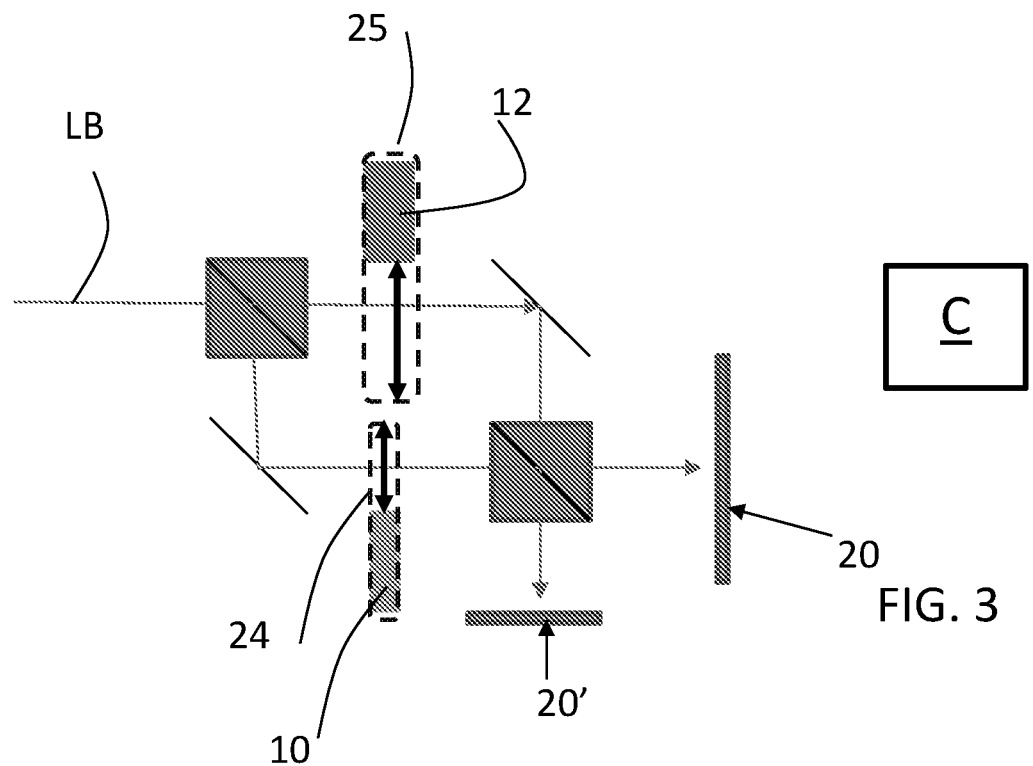

The invention will now be explained, referring to embodiments depicted in the drawings. Therein shows:

FIG. 1 schematically a first embodiment of an interferometer system, in a side view;

FIG. 2 the first embodiment after a rotational repositioning of the first light transmitting structure;

FIG. 3 schematically a further embodiment of the interferometer system; and

Figure 4:
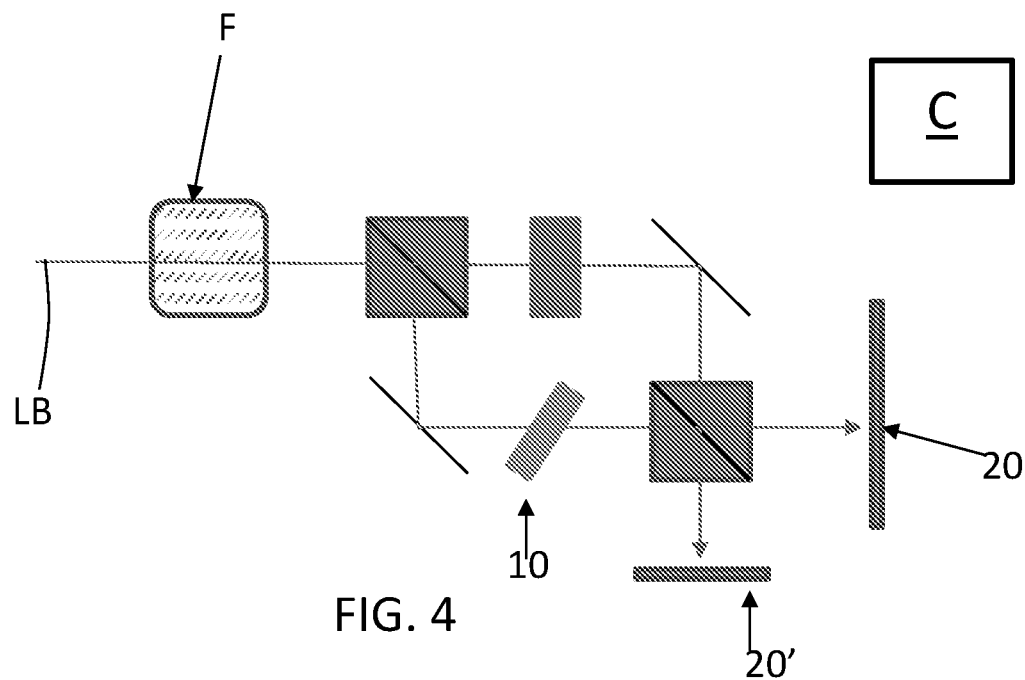

FIG. 4 a use of the interferometer system.

Similar or corresponding features are denoted by similar or corresponding reference signs in this application.

FIGS. 1-2 show an example of an interferometer system. In this case, the system has a Mach-Zehnder configuration. As is mentioned before, the general principles of the present invention can also be achieved with other interferometer layouts/configurations.

Basically, the system includes optical means 2, 3, 4, 5 arranged for directing light along a first interferometer path P1 and separate second interferometer path P2, and for combining the light for allowing interferometry. The optical means 2, 3, 4, 5 can include various optical elements, such as mirrors, lenses, beams splitters, beam combiners, as will be appreciated by the skilled person. In the depicted MZ-setup, a beam splitter 2 splits an incoming light beam LB into a first path P1 and second path P2 and a beams combiner 5 combines light emanating from the two paths P1, P2 to transmit the light via a first output path towards a detector 20. In the MZ-setup, the beam combiner provides a secondary output path to transmit combined (interfering) light to a secondary detector 20'. The first path P1 includes a first mirror 3 to divert light from the beam splitter 2 towards the beam combiner 5. Similarly, the first path P2 includes a second mirror 4 to divert light from the beam splitter 2 towards the beam combiner 5. The system can include a controlling means ("controller") C, for example a computer, processor, signal processor or the-like, which may include hardware and/or software, for example for controlling operation of the system and/or for processing or analyzing light detection signals provided by one or each detector 20, 10'. The controlling means C may include or be connectable to a user interface for allowing user input, a display for displaying interferometry results, a memory or storage means for storing data.

A first light transmitting structure 10 is located in the first interferometer path P1. Also, the second interferometer path P2 is provided with a second light transmitting structure 12. Each of these two light transmitting structures 10, 12 is configured to locally alter (increase) optical path length. To that aim, each light transmitting structure 10, 12 can be made of one (or more) material(s) having a higher refractive higher than 1, for example glass, optical glass, Schott glass and/or other material(s). The structure 10, 12 may include e.g. one or more glass plates or one or more glass layers.

A light transmitting structure 10, 12 may be made of a single light transmitting material, or a plurality such as in by a plurality of layers of different materials. In the examples, the first light transmitting structure 10 can include e.g. a light incident surface IS, as well as a light exit surface ES, wherein these surfaces IS, ES extend substantially in parallel with each other. The second light transmitting structure 12 can have e.g. the same configuration, with a light incident surface and parallel light exit surface.

In particular, the second light transmitting structure 12 may be configured for locally providing a second optical path difference, the second optical path difference being larger or smaller than a first optical path difference that is provided by the first light transmitting structure 10 in the respective first interferometer path P1. Thus, an overall interferometer system OPD can be set or defined by the two (or at least two) light transmitting structures 10, 12 located in the respective two interferometer paths. P1, P2.

The skilled person will appreciate that each said interferometer path P1, P2 may include a single light transmitting structures (as in the present examples), or more than one light transmitting structure, for example an array of at least two light transmitting structures.

A light beam LB entering the system can emanate from various light sources, depending e.g. on the field or application in which the system is to operate. The light may be natural light (e.g. star light, sun light, earth light) or artificially generated light (e.g. emanating from one or more dedicated man made-light sources). The light may e.g. be directly or indirectly transmitted from a said source to the interferometer system.

The light entering the system may be spectrally broadband or narrow band light, ranging from white light to monochromatic light, and may particularly be partly or fully coherent light. The light, to be detected by the system, may be partly or fully in the visible spectrum but that is not required. Thus, also, various types of detectors 20, 20' can be applied, including one or more camera's, CCD ('charge coupled device') image sensors or the-like, a said detector 20, 20' in particular being configured for detecting at least part of a spectrum of the light that traverses the interferometer paths during operation. The detector or detectors 20, 20' can be configured to generate a respective detector signal, that can be processes by the controlling means C, for example for generating an interferometer result, e.g. including an optical path difference (OPD).

According to an advantageous aspect, the first light transmitting structure 10 has a rotational position that is adjustable with respect to the optical axis of the respective first path P1, in which that structure 10 is located. This is shown in FIG. 2, wherein 10 has been rotated of an angle α with respect to an initial orthogonal position (i.e. the position shown in FIG. 1, wherein the optical axis of the light path P1 extends normally on the light incidence surface IS of the light transmitting structure 10).

It is preferred that a drive means 11 is provided, for adjusting the rotational position (i.e. the angle α) of the first light transmitting structure 10. The drive means 11 are schematically indicated in the drawings and can be provided by various means, for example an actuator, drive, motor, a servo, and/or a rotational support structure 11 for rotationally holding the adjustable light transmitting structure 10.

The controlling means C can be configured for setting a rotational position of the first light transmitting structure 10, for example by controlling the respective drive means 11. Such control can be carried out using a wired or wireless control link (not shown) between the drive means 11 and controlling means C as will be appreciated by the skilled person. Preferably, the rotational position of the first light transmitting structure 10 can be adjusted in relatively small angular steps, for example steps of at most 1 degree and preferably at most 0.1 degree. It has been found that by setting rotational position of the first light transmitting structure 10 using such angular steps, small, accurate and stable OPD adjustments can be obtained.

In this example, the second light transmitting structure 12 has a rotational position that is not adjustable with respect to an optical axis of the first path. In an alternative embodiment, the second light transmitting structure 12 can have a rotational position that is adjustable, for example via respective drive means and for example under control of the controlling means C.

In the present embodiment, a position of the first light transmitting structure 10 can be adjusted over an angle α of at least zero degrees between at least a first rotational and second rotational position with respect to the optical axis of the first path The first light transmitting structure 10 is preferably dimensioned such that it receives all light that traverses the respective first interferometer path P1, during operation, in both rotational positions.

Also, the first light transmitting structure 10 can have at least one rotational position with respect to the optical axis of the first path, in which the optical axis extends substantially normally onto an incident surface and/or exit surface of that structure 10 (as in FIG. 1).

In a preferred embodiment, the first light transmitting structure 10 is removable from the first path P1. This is depicted in FIG. 3. In particular, the system can include a first translational support structure 24, configured for removably holding the light transmitting structure 10. The first translational support structure 24 may be integrated with the rotational support structure 11, or alternatively, the first translational support structure 24 may be configured for removably holding the light transmitting structure 10 by removably holding the respective the rotational support structure 11. The first translational support structure 24 can be manually controllable, but is preferably automatically controllable, for example by the controlling means C of the system. Automatic control can e.g. include a drive, motor, servo or other actuator, arranged for setting a position of the first light transmitting structure 10 (or respective translational support structure 24) between an operating position (in the optical path P1, as in FIGS. 1, 2, 4) and a removed position wherein the first light transmitting structure 10 is removed from the light path (a in FIG. 3).

Optionally or alternatively (e.g. instead of the first light transmitting structure 10), the second light transmitting structure 12 can be removable from the respective second path P2. This is also depicted in FIG. 3. In particular, the system can include a second translational support structure 25, configured for removably holding the second light transmitting structure 12. The second translational support structure 25 can be manually controllable, but is preferably automatically controllable, for example by the controlling means C of the system. Automatic control can e.g. include a drive, motor, servo or other actuator, arranged for setting a position of the second light transmitting structure 12 (or respective translational support structure 25) between an operating position (in the optical path P2, as in FIGS. 1, 2, 4) and a removed position wherein the second light transmitting structure 12 is removed from the respective light path (a in FIG. 3).

The system preferably includes interferometer calibration means for setting a rotational position of the first light transmitting structure 10 based on a test signal, for example light having a predetermined light spectrum or spectrum component. FIG. 4 shows an example of providing a test signal, wherein a test signal provider F has been placed in the optical path leading into the interferometer system. The test signal provider F can e.g. be a container containing a test fluid, source light (e.g. broadband spectrum source light) passing through that fluid before entering the interferometer system. The test fluid can include one or more gasses, one or more liquids, one or more atomic or molecular test species, or any combination thereof, as will be clear to the skilled person. The test fluid can absorb one or more parts of a spectrum of source light, as can be detected by the interferometer system. A respective test fluid spectrum, detected by the system, can be used during subsequent system operation, for example for examining or searching for a subject or sample (or the-like) having the same or a corresponding spectrum.

Also, for example, the interferometer calibration means can be part of the controlling means C, wherein such controlling means C can be configured (e.g. programmed by suitable software in case of programmable controlling means) to control various system components to provide calibration data. Alternatively or additionally, the controlling means C can already include calibration data, for example predetermined data. Such data can for example include information concerning physical characteristics of various optical components of the interferometer system (e.g. material type, refractive index, material thickness measured along light transmission paths, et cetera) as will be clear to the skilled person. Such (calibration) data or information can e.g. be stored in a memory of the controlling means C.

More particularly, as an example, a calibration step can include removing one or both (each) of the light transmitting structure(s) 10, 12 from the respective light paths, so that source light can traverse the interferometer system (from first element 1 to the final element 5) without encountering this/these the light transmitting structure(s) 10, 12. Under such condition, calibrating source light can be transmitted through the system, to be detected by one or both detectors 20, 20' and the detection results being processed by the controlling means C for obtaining initial sensor calibration data, and for example e.g. for setting-up the system (e.g. placement and alignment of one or more of the main optical components 2, 3, 4, 5). The removing of one or both (e.g. each) of the intermediate light transmitting structure(s) 10, 12 can also be carried out after operation, for example for verifying system calibration.

Also, use of the system can include a (first) calibration step wherein light beams (e.g. broadband light, white light) are directed along the first interferometer path and second interferometer path, without the presence of the first light transmitting structure 10 in the first path and without the presence of a second light transmitting structure 12 in the second path. Then, in a subsequent second calibration step, light beams can be directed along the first interferometer path P1 and second interferometer path P2, with the presence of only the first light transmitting structure 10 in the first path P1, or only a second light transmitting structure 12 in the second path P2. Thus, calibration can take into account the first light transmission structure 10 and optional second first light transmission structure 12 as such. During such calibration, the first light transmitting structure 10 may for example be rotated to an initial angular position (e.g. as shown in FIG. 1), particularly a position wherein that element provides a lowest path-length difference.

Besides, a angular position calibrating step can include (the first light transmitting structure 10 being located in the respective first path P1): adjusting the rotational position of the first light transmitting structure 10 between a number of different positions and detecting respective detector responses. Thus, various rotational positions of the first light transmitting structure 10 can be correlated to respective interferometer system measurements and respective path length adjustments. Such information can be used to verify correct positioning or repositioning of the first light transmitting structure 10, and also e.g. to be used as respective calibration data.

During use (as is shown in the drawings), the system can direct light beams along the first interferometer path P1 and second interferometer path P2, and combine the beams allowing interferometry, e.g. utilizing an interference pattern detecting means (sensor) 20. The rotational position of the first light transmitting structure 10 can be set or adjusted to a predetermined position α (angle) for locally providing a respective optical path difference. The rotational position α can for example be a position that is based on calibration data, stored e.g. in the controlling means C and e.g. obtained during at least one calibration step. Also, the rotational position α can for example be a position that is based on a subject, sample or the-like that is to be examined.

For example, light can be used having a predetermined light spectrum or spectrum component, for example light that is passed through a test fluid before entering the interferometer paths P1, P2, wherein a rotational position of the first light transmitting structure 10 is set based on analysis of a detected interference pattern concerning the combined beams, particularly for optimizing the interference pattern.

Thus, a high-resolution interferometer system is provided, wherein a setting or adjusting of the rotational position α of the first light transmitting structure 10 can be used for accurate, stable setting of an OPD. Also, in a preferred embodiment the system can be a straight-forward or 'basic' (e.g. white light) interferometer in case both the first light transmitting structure 10 and optional second light transmitting structure 12 have been (temporarily) removed from the respective optical paths, wherein the system is (e.g. automatically) switchable/adjustable to said high-resolution interferometer system by (re-)installing the first light transmitting structure 10 and optional second light transmitting structure 12.

It should be clear to the person skilled in the art that the invention is not limited to the embodiments described above. Many alternatives are possible within the scope of protection as formulated in the claims hereafter.

References signs in the claims should not be construed as limiting the scope of the claims since they are entirely optional part of the claims.

The term "means" is to be broadly construed, it can for example be or include any device, unit or structure that can carry out the described function of the means. Also, the functions of a plurality of devices may be incorporated, integrated or included in a single device, unit, processor or the-like as will be appreciated by the skilled person.

OPD can be expressed in length (m, nm) or as a phase shift, or differently, as is known to the skilled person in the field of optics.

The invention claimed is:
1. An interferometer system, including optical elements arranged for directing light along a first interferometer path and separate second interferometer path, and for combining the light for allowing interferometry,
  wherein the first interferometer path is provided with a first light transmitting structure having a rotational position that is adjustable with respect to an optical axis of the first interferometer path, said first light transmitting structure generating a single optical path difference for all light in the first interferometer path received by the first light transmitting structure, and
  wherein the system is configured for manual removal of the first light transmitting structure from, and/or manual replacement of the first light transmitting structure into, the first interferometer path, or
  wherein the system includes a removal or displacement element for automatic removal of the first light transmitting structure from, and/or automatic replacement of the first light transmitting structure into, the first interferometer path.

2. The interferometer system according to claim 1, wherein the system includes a first translational support structure, configured for removably holding the first light transmitting structure.

3. The interferometer system according to claim 2, including a driver for adjusting the rotational position of the first light transmitting structure, the driver including a rotational support structure for rotationally holding the light transmitting structure.

4. The interferometer system according to claim 3, wherein the first translational support structure is integrated with the rotational support structure of the driver.

5. The interferometer system according to claim 3, wherein the first translational support structure is configured for removably holding the light transmitting structure by removably holding the respective rotational support structure of the driver.

6. The interferometer system according to claim 2, wherein first translational support structure is adjustable between an operating position wherein the first light transmitting structure is in the first interferometer path and a removed position wherein the first light transmitting structure is removed from the first interferometer path.

7. The interferometer system according to claim 1, wherein the first light transmitting structure includes a light incident surface, as well as a light exit surface that extends substantially in parallel with the light incident surface.

8. The interferometer system according to claim 1, wherein the rotational position of the first light transmitting structure can be adjusted over an angle of at least zero degrees between at least a first rotational and second rotational position with respect to the optical axis of the first path, wherein the first light transmitting structure is dimensioned such that it receives all light that traverses the respective first interferometer path, during operation, in both rotational positions.

9. The interferometer system according to claim 1, wherein the first light transmitting structure has at least one rotational position with respect to the optical axis of the first path, in which the optical axis extends substantially normally onto an incident surface and/or exit surface of that structure.

10. The interferometer system according to claim 1, wherein the second interferometer path is provided with a second light transmitting structure, having a rotational position that is not adjustable with respect to an optical axis of the second interferometer path.

11. The interferometer system according to claim 1, wherein the second interferometer path is provided with a second light transmitting structure for locally providing a second optical path difference, the second optical path difference being larger or smaller than said single optical path difference that is generated by the first light transmitting structure in the first interferometer path.

12. The interferometer system according to claim 10, wherein the second light transmitting structure is removable from the respective second interferometer path, and is in particular movable between an operating position in the second interferometer path, and a removed position wherein the second light transmitting structure is removed from the second interferometer path.

13. The interferometer system according to claim 10, wherein the system includes a second translational support structure, configured for removably holding the second light transmitting structure.

14. The interferometer system according to claim 13, including a controller arranged for setting a position of the second light transmitting structure or the second translational support structure.

15. The interferometer system according to claim 1, wherein the first light transmitting structure includes one or more glass plates or one or more glass layers.

16. The interferometer system according to claim 1, wherein the system has a Mach-Zehnder or a Michelson interferometer layout.

17. The interferometer system according to claim 1, including a controller configured to set the rotational position of the first light transmitting structure based on calibration data obtained from interferometry of a test signal by said interferometer system.

18. An interferometry method comprising:
  at least a first calibration step comprising obtaining calibration data from interferometry of a test signal,
    wherein the calibration data is obtained by directing first and second beams of the test signal along a first interferometer path and a separate second interferometer path, respectively, and combining the beams of the test interferometry,
    wherein a first light transmitting structure, having a rotational position that is adjustable with respect to an optical axis of the first interferometer path, is absent in the first calibration step but is present in the first interferometer path in a subsequent, interferometry measurement step,
  the interferometry measurement step comprising directing first and second light beams of a sample along the first interferometer path and the second interferometer path, respectively, and combining the light beams of the sample allowing interferometry,
    wherein, during the interferometry measurement step, the rotational position of the first light transmitting structure is set based on said calibration data obtained from said first calibration step, and
    wherein an interference pattern from combining the light beams of the sample is detected over a time period in which the rotational position of the first light transmitting structure is fixed.

19. The method according to claim 18, wherein a first translational support structure is configured for removably holding the first light transmitting structure, wherein during the first calibration step the first translational support structure has been adjusted from an operating position wherein the first light transmitting structure is in the first interferometer path to a removed position wherein the first light transmitting structure is removed from the first interferometer path.

20. The method according to claim 18, wherein during the first calibration step, the test signal comprises broadband light or white light.

21. The method according to claim 18, including a second calibration step wherein the first and second beams of the test signal are directed along the first interferometer path and second interferometer path, respectively, with the presence of the first light transmitting structure in the first interferometer path and with the presence of a second light transmitting structure in the second interferometer path,
wherein the first and second beams of the test signal have a predetermined light spectrum or spectrum component, wherein the calibration data includes an analysis of a detected interference pattern of the first and second beams of the test signal.

22. The interferometer system of claim 1, wherein the first light transmitting structure extends in the first interferometer path and not in the second interferometer path.

23. The method of claim 18, wherein, during the interferometry measurement step, the first light transmitting structure extends in the first interferometer path and not in the second interferometer path.

24. The interferometer system of claim 1, wherein the system includes the removal or displacement element for automatic removal of the first light transmitting structure from, and/or automatic replacement of the first light transmitting structure into, the first interferometer path.

25. The interferometer system of claim 17, wherein the calibration data are stored in the controller.

26. The interferometer system of claim 17, wherein the calibration data are obtained by directing the test signal along the first interferometer path and the second interferometer path, without the first light transmitting structure being present in the first interferometer path.

27. The interferometer system of claim 17, wherein the test signal has a light spectrum or spectrum component corresponding to that of a sample to be analyzed by the interferometer system, after the rotational position of the first light transmitting structure is set by the controller.

28. The method of claim 18, wherein the calibration data are stored in a controller configured to set the rotational position of the first light transmitting structure during the interferometry measurement step, based on said calibration data.

29. The method of claim 18, wherein the test signal in the first calibration step has a spectrum corresponding to that of the sample in the interferometry measurement step.

30. An interferometry method comprising:
a first calibration step comprising directing first and second beams of broadband light or white light along a first interferometer path and a separate second interferometer path, respectively;
a second calibration step comprising directing first and second beams of light having a predetermined light spectrum or spectrum component along the first interferometer path and the second interferometer path, respectively;
an interferometry measurement step, comprising directing first and second light beams of a sample along the first interferometer path and the second interferometer path, respectively, and combining the light beams of the sample allowing interferometry,
wherein a first light transmitting structure, having a rotational position that is adjustable with respect to an optical axis of the first interferometer path, is absent in the first calibration step but is present in the first interferometer path in the second calibration step and in the interferometry measurement step.

31. The method of claim 30, wherein said light having a predetermined light spectrum or spectrum component is provided from a test signal provider placed in an optical path leading to the first interferometer path and the second interferometer path.

32. The method of claim 31, wherein the test signal provider is a test fluid.

33. The method of claim 30, wherein, in said interferometry measurement step, the rotational position of the first light transmitting structure is set based on calibration data obtained in the first and second calibration steps.

34. The method of claim 33, wherein the calibration data are stored in a controller.

35. The method of claim 30, wherein the predetermined light spectrum or spectrum component of the first and second beams in the second calibration step corresponds to that of the sample in the interferometry measurement step.

* * * * *